US005847665A

United States Patent [19]
Tu

[11] Patent Number: 5,847,665
[45] Date of Patent: Dec. 8, 1998

[54] METHOD AND DEVICE OF ENCODING-DECODING FOR ACTUATING SYSTEM

[75] Inventor: Shih-Ping Tu, Hou Lung Town, Taiwan

[73] Assignee: Holtek Microelectronics Inc., Hsinchu, Taiwan

[21] Appl. No.: 760,018

[22] Filed: Dec. 4, 1996

[51] Int. Cl.[6] .................... H04Q 9/16

[52] U.S. Cl. .................... 341/50; 340/825.65

[58] Field of Search .................... 341/50, 67; 340/825.65, 340/825.56, 825.62

[56] References Cited

U.S. PATENT DOCUMENTS

| | | | |
|---|---|---|---|
| 4,315,249 | 2/1982 | Apple et al. | 340/825.52 |
| 4,426,637 | 1/1984 | Aple et al. | 340/825.65 |
| 5,554,977 | 9/1996 | Jablonski et al. | 340/825.31 |

*Primary Examiner*—Marc S. Hoff
*Assistant Examiner*—Peguy JeanPierre
*Attorney, Agent, or Firm*—Friedman Siegelbaum LLP

[57] ABSTRACT

The present invention provides an encoding-decoding method for an actuating system having an encoding device, a decoding device, at least one code having a counter code, and an actuating device. The method includes steps of: a) executing a first logic operation on said at least one code for obtaining a specific expansion code in said encoding device to form a transmission code including said specific expansion code and said counter code; b) transmitting said transmission code to said decoding device; and c) executing a second logic operation on said at least one code and said counter code to obtain an operated code for identifying whether said operated code is matchable with said specific expansion code in said decoding device.

31 Claims, 4 Drawing Sheets

METHOD AND DEVICE OF ENCODING-DECODING FOR ACTUATING SYSTEM

FIELD OF THE INVENTION

The present invention relates to an encoding-decoding method and device, and especially relates to an encoding-decoding method and device for an actuating system.

BACKGROUND OF THE INVENTION

A conventional encoding-decoding device for a wireless remote-controlled actuating system such as those used in A garage-door or a car-door alarm systems, one of which is as shown in FIG. 1, has an encoder for generating and transmitting a code, and a decoder for receiving and decoding the code. The code transmitted by the encoder and received by the decoder, as shown in FIG. 2, has an address code for identification and a data code for controlling. Conventionally, such a code has a fixed format and a fixed address, and thus is easy to be ascertained. The codeascertainer just has to intercept and copy the transmission code, and retransmit the copied code to the decoder to break down the system. Accordingly, such a system cannot provide a safe protection.

Another conventional device is developed to increase the safety of the wireless actuating system. The method for preventing the system to be broken by coping and re-transmitting the code is a specific expansion code system. In such a system, the transmission code is changed each time, so that the copied code cannot pass the identification of the decoder. Furthermore, there must have two counters or other synchronous devices at both the encoder and the decoder to ensure that the transmission code from the encoder is identical to the identifying code. The identifying code of the decoder must be refreshed each time in response to the transmission code. A problem may occur that if the transmission code is erroneously received by the decoder, the identifying code will not be refreshed, and the next transmission code will thus no longer match with the identifying code, so the whole system cannot work properly.

One of the specific expansion code system has a rolling-code encoder for generating a specific address code for each transmission according to a counter, but such a design needs lots of memory space to store different codes, and thus increasing the cost greatly.

SUMMARY OF THE INVENTION

An object of the present invention is to provide an encoding-decoding method and device for preventing a failure of an actuating system by coping and re-transmitting the code.

Another object of the present invention is to provide an encoding-decoding method and device with high security without a large amount of memory space.

A further object of the present invention is to provide a specific expansion code encoding-decoding method and device which can selfsolve the non-synchronous problem caused by missed transmission code. These and other objects of the invention, which shall become hereafter apparent, are achieved by a method and device of encoding-decoding for an actuating system. The method involves executing a first logic operation on the at least one code for obtaining a specific expansion code in the encoding device to form a transmission code including the specific expansion code and the counter code, transmitting the transmission code to the decoding device and executing a second logic operation on the at least one code and the counter code to obtain an operated code for identifying whether the operated code is matchable with the specific expansion code in the decoding device.

The present invention further provides an encoding-decoding device for an actuating device, which includes: a specific expansion code generator for generating a specific expansion code having a first operation relationship with a last generated specific expansion code; an encoding-operation device electrically connected with the specific expansion code generator for executing a first logic operation on a first at least one code including the specific expansion code for generating a specific expansion code; an encoder electrically connected with the encoding-operation device for generating a transmission code including the specific expansion code and a data code; a decoding-operation device for executing the first logic operation on a second at least one code including a portion of the transmission code for generating a comparison code; and a decoding-comparison device electrically connected between the actuating device and the decoding operation device for comparing the specific expansion code and the comparison code, and transmitting the data code for the actuating device for executing an instruction for the actuating device when the comparison code is matchable with the specific expansion code.

The present invention may best be understood through the following description with reference to the accompanying drawings, in which:

DETAILED DESCRIPTION OF THE PREFERRED EMBODIMENTS

Figure 3:
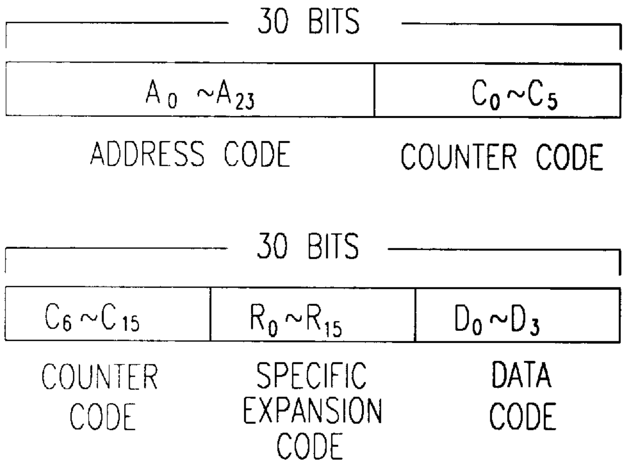
FIG. 3 illustrates the format of a preferred embodiment of a transmission code according to the present invention.
Figure 4:
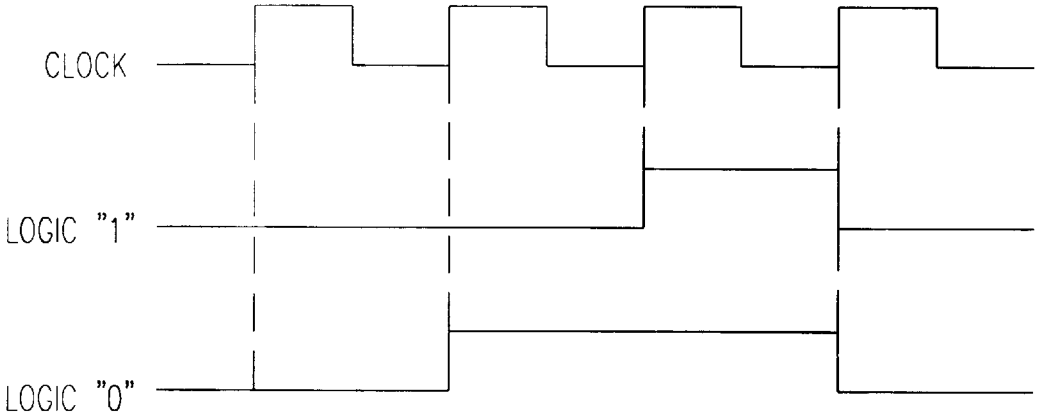
FIG. 4 is a time sequence chart of a preferred embodiment of a waveform of the transmission code according to the present invention.

A preferred embodiment of a code format of an encoding-decoding method according to the present invention is illustrated in FIG. 3. The code can be separated as A group and B group. The A group has a 24-bit address code and a 6-bit counter code, and the B group has a 10-bit counter code, a 16-bit specific expansion code, and a 4-bit data code. Furthermore, the time chart of the logic "0" and logic "1" of each bit can be illustrated as FIG. 4.

Figure 1:
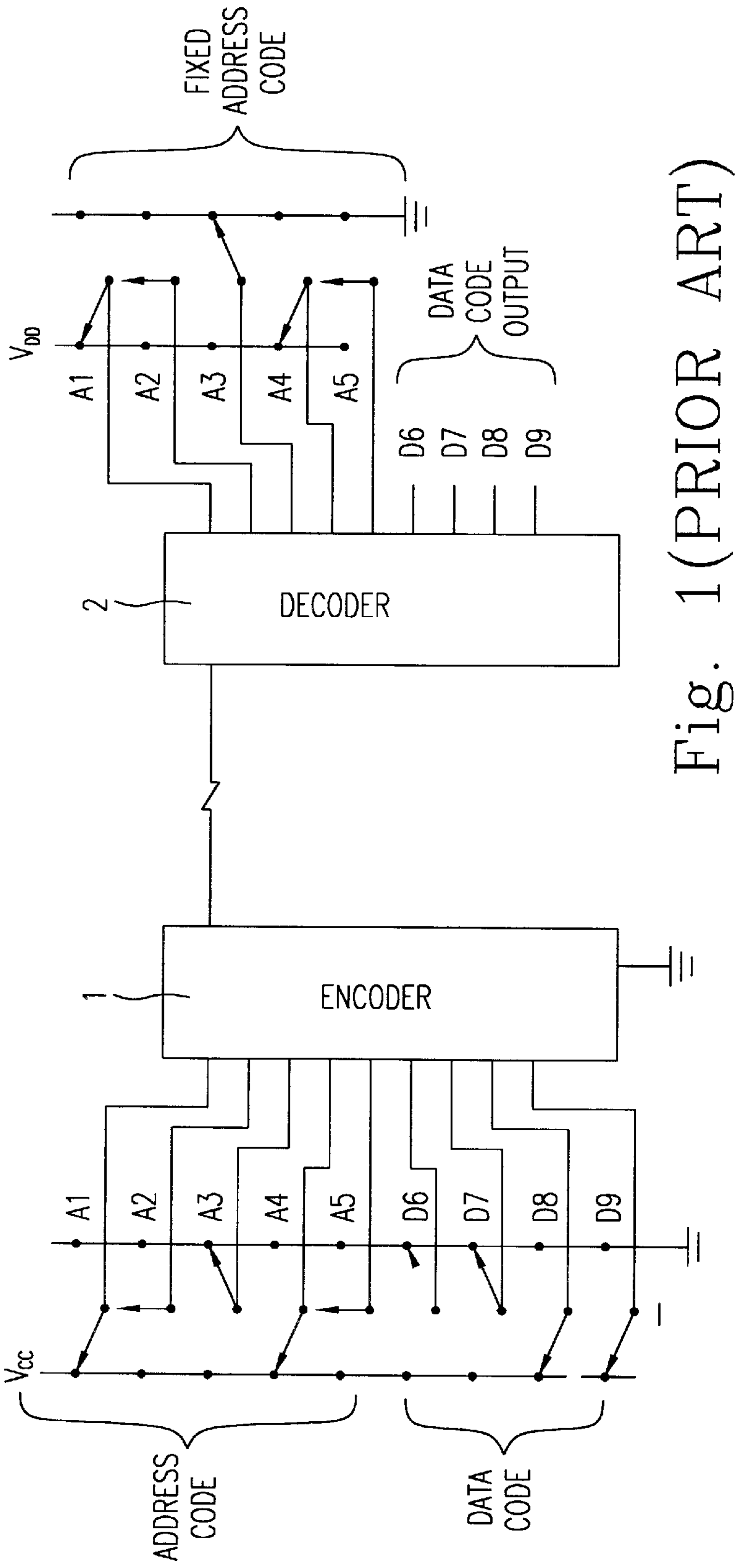
Fig. 1(PRIOR ART)
FIG. 1 is a diagram of a conventional encoding-decoding device.
Figure 2:
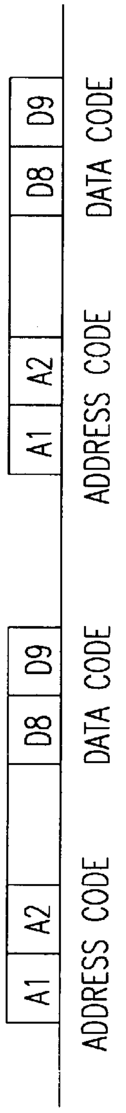
Fig. 2(PRIOR ART)
FIG. 2 illustrates the format of transmission codes of the conventional encoding-decoding device.
Figure 5:
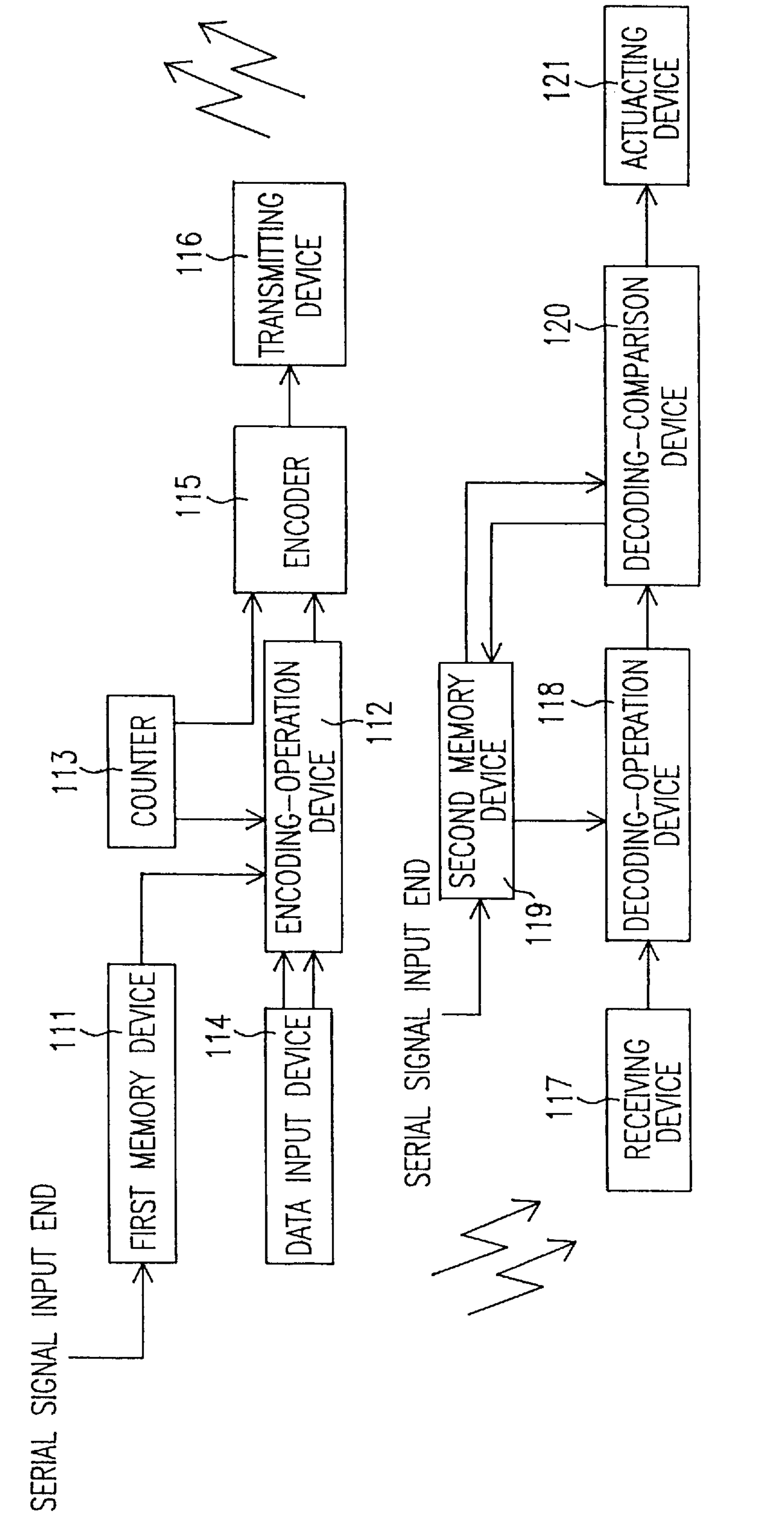
FIG. 5 is a schematic illustration of a preferred embodiment of an encoding-decoding device according to the present invention.

Such a code can be generated and transmitted by an encoding transmitting device 1 shown in FIG. 5. The first memory device 111 is a programmable read only memory (PROM) or an electrically erasable programmable read only memory ($E^2$PROM) having a serial signal input end. A 24-bit fixed code is inputted from the serial input end of the first memory device for encoding. The fixed code is inputted in a serial manner such that the parallel input ends shown in FIG. 1 can be minimized and thus reduce the cost of the IC package. The encoding operation device 112 is a Boolean function circuit. The encoding operation device 112 executes a logic operation between the fixed code stored in the first memory device 111 and the 16-bit counter code generated by the counter 113 in response to an encoding requirement. Accordingly, the 24-bit address code is obtained from the result of the logic operation. Another logic operation executed among the fixed code, the counter code and the 4-bit data code inputted from the data code inputting device 114 is executed by the encoding operation device 112, and, accordingly, the 16-bit specific expansion code is obtained. The encoding operation device 112 then outputs the address code and the specific expansion code to the encoder 115. The encoder 115 combines the address code, the specific expansion code, the counter code from the upward counter 113, and the data code from the data code inputting device 114 into the 60-bit code having the format shown in FIG. 3. The 60-bit code is then inputted into the transmitting device 116 and is transmitted to the receiving device 117. The transmission between the transmitting device 116 and the receiving device 117 is performed by an electromagnetic wave transmission.

The transmission code from the transmitting device 116 is received and decoded by a receiving-decoding device 2. The operation situations of the receiving-decoding device 2 include a normal mode and a learning mode. When it is in a normal mode, the receiving device 117 receives the code transmitted from the transmitting device 116, and outputs it to the decoding operation device 118 for decoding.

Figure 6A:
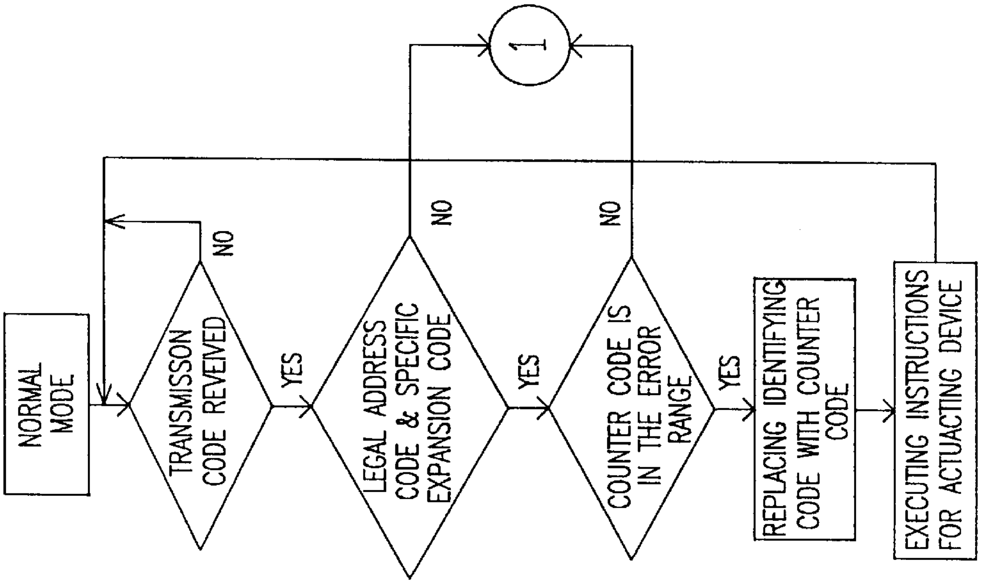
FIGS. 6(*a*) and 6(*b*) are flow charts of a preferred embodiment of the encoding-decoding method according to the present invention.
Figure 6B:
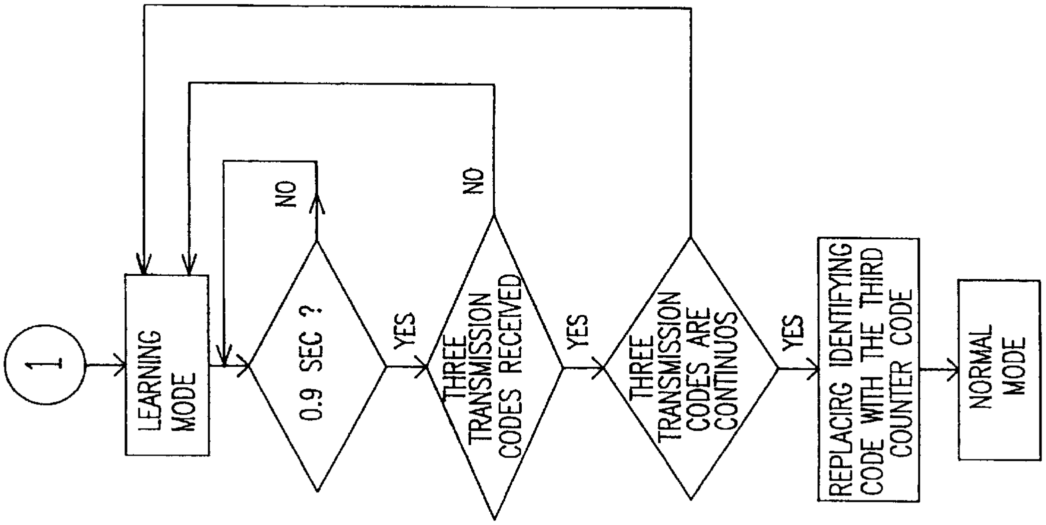

The decoding operation device 118 undergoes logic operations identical to those done by the encoding operation device 112 among the 16-bit counter code and the 4-bit data code of the transmission code, and the fixed code stored in the second memory device 119 which may be either a PROM or an $E^2$PROM. The operated results are compared to the address code and the specific expansion code of the transmission code. If the operated results are identical to the transmitted address code and specific expansion code, the hole transmission code is regarded as an legal code except the counter code portion. The counter code has to be checked individually to increase the safety of the system. The last transmitted counter code is stored in the second memory device 119 as an identifying code. The current transmitted counter code is compared with the identifying code (ID code) by the decoding comparison device 120. If ID code+1≦ current transmitted counter code ≦ ID code+5, then the current transmitted counter code is regarded as a legal counter code and the identifying code stored in the second memory device 119 is replaced by the legal counter code. Furthermore, the decoding comparison device 120 will trigger the actuating device 121 to execute the instructions transmitted by the data code. If any one of the identifications for the address code, the specific expansion code and the counter code is failed, the operation of the receiving-decoding device 2 will be switched to the learning mode, thus preventing the system from being broken by an illegal code. The flow of the identifying process is illustrated in FIG. 6(*a*).

When operating the actuating system, the situation of switching to the learning mode may happen in the case that the missed transmission code occurs due to a mis-triggering of the encoding-transmitting device 1 by the user. Because the transmission code is not received by the receiving-decoding device 2, the identifying code is not refreshed by the current transmitted counter code, and then a synchronous problem will happen. Once if the current transmitted counter code is not in the range from (ID code+1) to (ID code+5), the decoding comparison device 120 will trigger the receiving-decoding device 2 to switch to the learning mode.

When the system is in the learning mode, the actuating device 121 will not execute any instruction. Referring to FIG. 6(*b*), a specified process is designed for returning to the normal mode. The user must transmit three continuous code having the format illustrated in FIG. 3 during 0.9 second by the encoding-transmitting device 1. The three transmission codes are checked by the receiving-decoding device 2 to find whether the counter code portions of the three transmission code are continuous or not. If they are continuous, the other portion of the transmission code is identified to ensure that they are legal. If all the identifications are passed, the third counter code of the three continuous codes will take the place of the non-synchronous identifying code in the second memory device 119, and the system will be switched back to the normal mode.

According to the forward descriptions, the present invention performs a specific expansion code of an actuating system by simple logic circuits to prevent the breaking of an illegal user by coping and retransmitting the code. Furthermore, the large amounts of the memory space and IC ends of the conventional specific expansion code systems are no more needed in the present invention, and the non-synchronous problem between the emitter and the receiver is also solved.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An encoding-decoding method for an actuating system having an encoding device, a decoding device, operation codes including a counter code and a fixed code, and an actuating device, comprising steps of:

a) executing a first logic operation on said operation codes for obtaining a specific expansion code in said encoding device to form a transmission code including a first portion containing said specific expansion code and a second portion containing said counter code;

b) transmitting said transmission code to said decoding device; and c) executing a second logic operation on said operation codes to obtain an operated code for identifying whether said operated code is matchable with said specific expansion code in said decoding device;

wherein said counter code is a multi-bit counter code.

2. A method according to claim 1 wherein said transmission code further includes a third portion containing a data code including an instruction for said actuating device.

3. A method according to claim 2, further comprising a step of:

d) executing said instruction for said actuating device when said operated code is matchable with said specific expansion code in said step c).

4. A method according to claim 3, wherein an identifying code is stored in said decoding device, and said method further includes a step of:

d0) replacing said identifying code with said counter code.

5. A method according to claim 4 wherein said fixed code stored in both said encoding device and said deciding device.

6. A method according to claim 5 wherein said operation codes further includes said data code.

7. A method according to claim 6 wherein said step c) includes steps of:

c1) executing said second logic operation the same as said first logic operation on said fixed code, said counter code and said data code for obtaining a first comparison code;

c2) checking whether said first comparison code is matchable with said specific expansion code or not; and c3) executing a learning process when said first comparison code is not matchable with said specific expansion code.

8. A method according to claim 7 wherein said learning process includes steps of:

c31) continuously transmitting three said transmission codes to said decoding device; and c32) replacing said identifying code with said counter code contained within said second portion of the third one of said three transmission codes.

9. A method according to claim 4, further comprising steps before said step d0):

d10) checking whether said counter code is in a pre-set error range or not; and d20) executing a learning process when said counter code is not in said pre-set error range.

10. A method according to claim 9 wherein said error range is ranged from a first sum of said identifying code plus 1 to a second sum of said identifying code plus 5.

11. A method according to claim 9 wherein said learning process includes steps of:

d201) continuously transmitting three said transmission codes to said decoding device; and d202) replacing said identifying code with said counter code contained within said second portion of the third one of said three transmission codes.

12. A method according to claim 5 wherein said transmission code further includes a fourth portion containing an address code obtained from a result of a third logic operation executed between said fixed code and said counter code.

13. A method according to claim 12 wherein before said step d) said method further includes steps of:

d01) executing said third logic operation between said fixed code and said counter code for obtaining a second comparison code;

d02) checking whether said second comparison code is identical to said address code or not; and d03) executing a learning process when said second comparison code is not identical to said address code.

14. A method according to claim 13 wherein said learning process includes steps of:

d031) continuously transmitting three said transmission codes to said decoding device; and d032) replacing said identifying code with said counter code contained within said second portion of the third one of said three transmission codes.

15. A method according to claim 14 wherein said time duration is 0.9 second and said at least two transmission codes have a number of three.

16. A method according to claim 14 wherein said learning process further includes a step of:

replacing said identifying code with the last one of said at least two continuous counter codes.

17. An encoding-decoding method for an actuating system having an encoding device, a decoding device and an actuating device, comprising steps of:

a) generating a transmission code including a first portion containing a specific expansion code in said encoding device;

b) transmitting said transmission code to said decoding device;

c) identifying whether said transmission code is legal or not in said decoding device;

d) executing an instruction for said actuating device when said transmission code is identified as a legal code;

e) executing a learning process when said transmission code is identified as an illegal code; and f) executing said instruction for said actuating device when a pre-set process has been performed during said learning process, wherein said learning process includes a step of;

f1) repeatedly checking whether said pre-set process is performed or not until said preprocess has been performed, and said pre-set process includes steps of;

f11) transmitting at least two said transmission codes according to a least two said counter codes which are continuous from said encoding device in a time duration; and f12) repeatedly checking two conditions in said decoding device whether said at least two transmission codes are received within said time duration, and whether said at least two counter codes of said transmission codes are continuous or not, until said two conditions are satisfied.

18. A method according to claim 17 wherein said specific expansion code is dependent on a counter code included in a second portion of said transmission code, and said step c) includes steps of:

c1) identifying whether said specific expansion code is legal or not; and c2) identifying whether a difference between said counter code and an identifying code stored in said decoding device is in an error range or not.

19. An encoding-decoding device for an actuating device, comprising: a specific expansion code generator for generating a specific expansion code having a first operation relationship with a last generated specific expansion code;

an encoding-operation device electrically connected with said specific expansion code generator for executing a first logic operation on a first at least one code including said specific expansion code for generating a specific expansion code;

an encoder electrically connected with said encoding-operation device for generating a transmission code including a portion of said transmission code for generating a comparison code; and a decoding-comparison device electrically connected between said actuating device and said decoding operation device for comparing said specific expansion code and said comparison code, and transmitting said data code for said actuating device for executing an instruction for said actuating device when said comparison code is matchable with said specific expansion code, wherein said specific expansion code generator is an upward counter, said specific expansion code is a counter code generated by said upward counter, and said first operational relationship is that said specific expansion code equals to said last specific expansion code plus 1.

20. A device according to claim 19 wherein said specific expansion code generator is an upward counter, said specific expansion code is a counter code generated by said upward counter, and said first operation relationship is that said specific expansion code equals to said last specific expansion code plus 1.

21. A device according to claim 19 wherein said decoding-comparison device further identifies whether a second operation relationship between said counter code and an identifying code exists or not.

22. A device according to claim 21 wherein said second operation relationship is that: said identifying code plus 1 $\leqq$ said counter code $\leqq$ said identifying code plus 5.

23. A device according to claim 20 wherein said first at least one code further includes said counter code and a fixed code, and said second at least one code further includes said counter code and said fixed code.

24. A device according to claim 23, wherein said transmission code further includes an address code, and said encoding-operation device further executes a second logic operation between said fixed code and said counter code for obtaining said address code.

25. A device according to claim 24 wherein said device further comprises:

a first memory device for storing therein said fixed code;

a data input device electrically connected to said encoding-operation device for inputting thereby said data code;

a transmitting device electrically connected to said encoder for transmitting said transmission code;

a receiving device electrically connected to said decoding-operation device for receiving and transmitting said transmission code to said decoding-operation device; and a second memory device for storing therein said fixed code and said identifying code.

26. A device according to claim 25 wherein said first memory device includes a PROM having an serial inputting end for inputting therefrom said fixed code.

27. A device according to claim 26 wherein said PROM is an $E^2$PROM.

28. A device according to claim 25 wherein said second memory device includes a PROM having a serial inputting end for inputting therefrom said fixed code, and a RAM for storing therein said identifying code.

29. A device according to claim 28 wherein said PROM is an $E^2$PROM.

30. A device according to claim 25 wherein each of said encoding operation device and said decoding-operation device includes a Boolean function circuit for performing a respective one of said first and second logic operations.

31. A device according to claim 25 wherein said transmission code is transmitted between said transmitting device and said receiving device by an electromagnetic wave transmission.

* * * * *